United States Patent [19]

Susi

[11] 3,826,873

[45] July 30, 1974

[54] SWITCHING CIRCUIT EMPLOYING LATCHING TYPE SEMICONDUCTOR DEVICES AND ASSOCIATED CONTROL TRANSISTORS

[75] Inventor: A. Frederick Susi, Dedham, Mass.

[73] Assignee: GTE Sylvania Incorporated, Stamford, Conn.

[22] Filed: Oct. 12, 1971

[21] Appl. No.: 188,166

[52] U.S. Cl. .......................... 179/18 GF, 340/166 R

[51] Int. Cl. .............................................. H04g 3/50

[58] Field of Search ............ 179/18 GF; 340/166 R; 307/252 J, 252 K

[56] References Cited

UNITED STATES PATENTS

| | | | |
|---|---|---|---|
| 3,251,036 | 5/1966 | Smith | 179/18 GF |
| 3,456,084 | 7/1969 | Haselton | 179/18 GF |
| 3,531,773 | 9/1970 | Beebe | 179/18 GF |
| 3,542,963 | 11/1970 | Aagaard | 179/18 GF |
| 3,564,291 | 2/1971 | Aagaard | 307/252 J |
| 3,601,547 | 8/1971 | Potter | 179/18 GF |
| 3,694,812 | 9/1972 | Enomoto | 340/166 R |
| 3,781,484 | 12/1973 | Macrander | 179/18 GF |

FOREIGN PATENTS OR APPLICATIONS

| | | | |
|---|---|---|---|
| 1,511,705 | 12/1967 | France | 179/18 GF |

*Primary Examiner*—Thomas W. Brown
*Attorney, Agent, or Firm*—David M. Keay; Elmer J. Nealon; Norman J. O'Malley

[57] ABSTRACT

Crosspoint switching array, each crosspoint switching circuit including silicon controlled switches for connecting signal lines of one group of transmission lines to signal lines of another group. For each silicon controlled switch a transistor having its collector connected through a blocking diode to the gate electrode is connected between control lines of the two groups of lines. Coincident pulses on the control lines cause current to flow in the transistors thereby switching the silicon controlled switches to conduction and providing signal paths between the two groups of lines.

4 Claims, 1 Drawing Figure

PATENTED JUL 30 1974 3,826,873
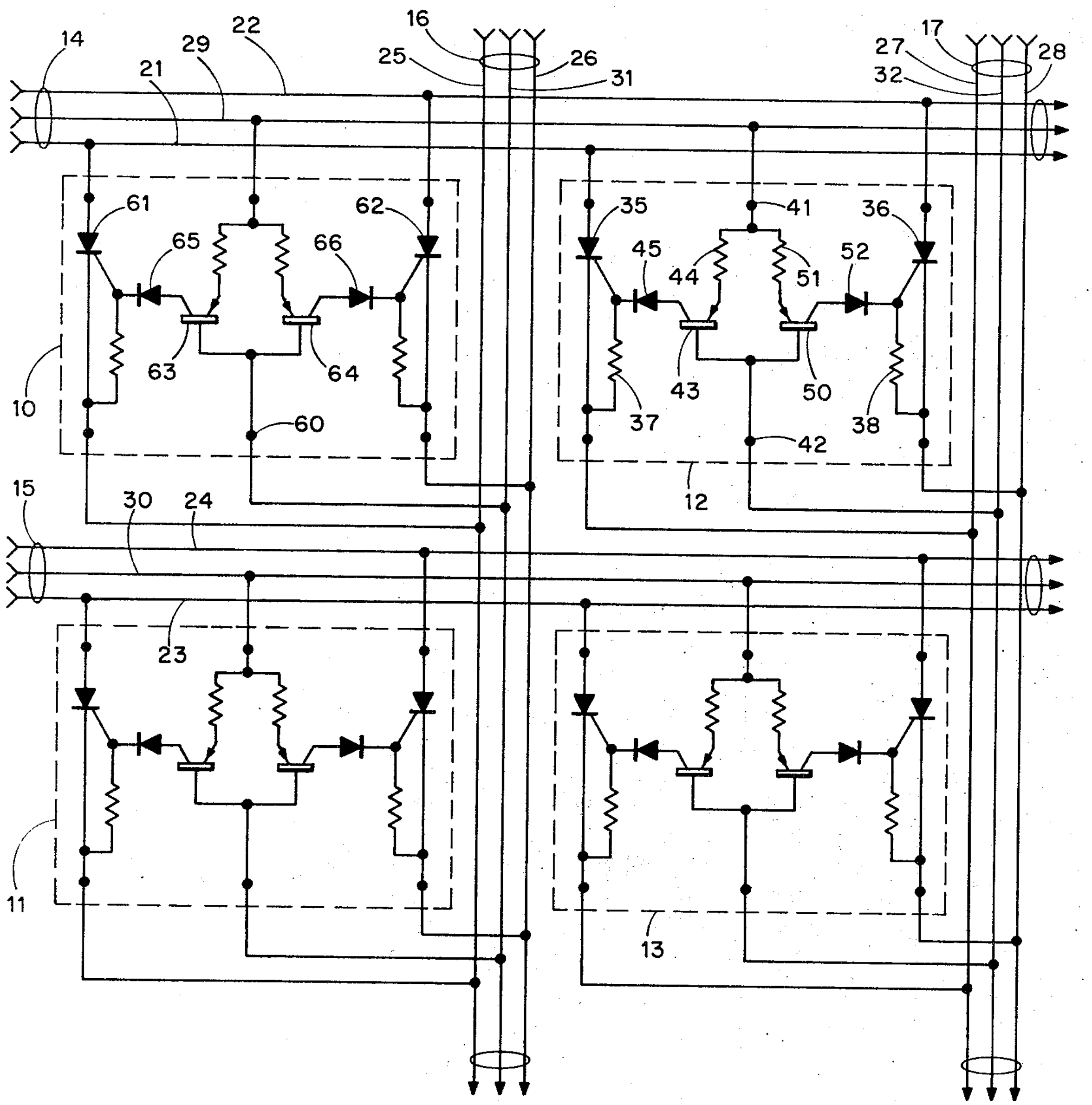

SWITCHING CIRCUIT EMPLOYING LATCHING TYPE SEMICONDUCTOR DEVICES AND ASSOCIATED CONTROL TRANSISTORS

BACKGROUND OF THE INVENTION

This invention relates to switching circuits. More particularly, it is concerned with solid state switching circuits for use in crosspoint switching arrays.

Crosspoint switching arrays employing solid state devices have been developed for use in switching networks in communication systems. Switching arrays employing controlled latching semiconductor devices such as silicon controlled rectifiers (SCR) and silicon controlled switches (SCS) are described and claimed in U.S. Pat. No. 3,456,084 entitled "Switching Network Employing Latching Type Semiconductors" issued on July 15, 1969, to Ernest F. Haselton, Jr., and assigned to the assignee of the present invention.

With the advent of techniques for producing monolithic integrated circuit networks within a single body of semiconductor material, it has become desirable to employ switching circuits for crosspoint arrays which are amenable to fabrication as monolithic integrated circuits. Integrated circuits should employ a minimum number of components and the individual components should be small in order that the number of circuits fabricated within a given semiconductor body can be large. In addition, in order to minimize noise problems it is desirable that switching circuits for crosspoint arrays not draw excessive or unnecessary currents, particularly while connections are being established to other switching circuits of the array.

SUMMARY OF THE INVENTION

An improved crosspoint switching array in accordance with the present invention is amenable to fabrication in monolithic integrated circuit form, and also avoids leakage current problems. The crosspoint array established particular signal transmission paths between selected transmission line groups of first and second sets of transmission line groups. Each transmission line group of the first set is associated with each transmission line group of the second set at separate ones of a multiplicity of crosspoints, and each transmission line group has at least one signal line and a control line.

The switching array includes a controlled latching semiconductor device, such as an SCR or an SCS, for each signal transmission path between a transmission line group of the first set and a transmission line group of the second set at each crosspoint. Each of the controlled latching semiconductor devices has a first and a second signal electrode and a gate electrode. The first and second signal electrodes are connected between signal lines in the first and second sets of transmission line groups. A resistance is connected between the gate electrode and the second signal electrode of each of the controlled latching semiconductor devices.

At each crosspoint there is a transistor means having an emitter connection for connecting to the control line of the transmission line group of one of the sets of transmission line groups and a base connection for connecting to the control line of the transmission line group of the other of the sets of transmission line groups. The transistor means also has a collector connection through a blocking means to the gate electrode of each of the controlled latching semiconductor devices at the crosspoint. All current flow between the control lines at the crosspoint is caused to flow across an emitter-base junction of the transistor means thereby causing collector current to flow into the gate electrodes of the controlled latching semiconductor devices at the crosspoint.

A blocking means is connected between the gate electrode of each controlled latching semiconductor device and a collector connection of the transistor means in order to block the flow of current along the path from the signal line connected to the first signal electrode of the semiconductor device, into the semiconductor device, from the gate electrode to the collector connection, through the transistor means, and from the base connection of the transistor means to the control line connected to the base connection. The blocking means prevent the flow of transient leakage currents during switching as will be explained hereinbelow.

When coincident pulses are applied to selected control lines of the first and second sets of transmission line groups, current is caused to flow through the transistor means at the crosspoints selected by the particular control lines. Current flows from the transistor means to the gate electrodes of associated controlled latching semiconductor devices thereby establishing particular signal transmission paths between the selected transmission line groups through those controlled latching semiconductor devices.

BRIEF DESCRIPTION OF THE DRAWING

Additional objects, features, and advantages of switching circuits in accordance with the invention will be apparent from the following detailed discussion together with the accompanying drawing wherein the single FIGURE is a schematic circuit diagram of a 2-by-2 matrix from an array of crosspoint switching circuits in accordance with the present invention.

DETAILED DESCRIPTION OF THE INVENTION

Shown in the drawing is a switching array which for simplicity is a 2-by-2 matrix of switching crosspoints. The crosspoint switching elements 10, 11, 12, and 13 may be fabricated as monolithic integrated circuits in a single body of semiconductor material. With the array as illustrated, either the first or second group of transmission lines 14 and 15 of a first set can be connected to either the first or second transmission line group 16 or 17 of a second set as desired. That is, any transmission line group 14 or 15 of the first set may be connected to any transmission line group 16 or 17 of the second set by activation of the appropriate crosspoint switching circuit 10, 11, 12, or 13. Each of the transmission line groups 14, 15, 16, and 17 as illustrated includes two signal lines 21 and 22, 23 and 24, 25 and 26, and 27 and 28, and a single control line 29, 30, 31, and 32, respectively.

All of the crosspoint switching circuits 10, 11, 12, and 13 of the array are identical. For illustrative purposes, the crosspoint switching circuit 12 of the matrix which when activated serves to connect the first transmission line group 14 of the first set with the second transmission line group 17 of the second set will be described in detail. The switching circuit 12 includes a first silicon controlled switch (SCS) 35 with its anode connected directly to signal line 21 of the first transmission line group 14 of the first set and with its cathode connected directly to signal line 27 of the second transmission line group 17 of the second set. Similarly, a second silicon controlled switch 36 has its anode connected to the other signal line 22 of the first transmission line group 14 of the first set and its cathode connected directly to the other signal line 28 of the second transmission line group 17 of the second set. A resistance 37 is connected between the control or gate electrode and the cathode electrode of the first silicon controlled switch 35, and a second resistance 38 is similarly connected between the gate electrode and the cathode electrode of the second silicon controlled switch 36.

The control line 29 of the first transmission line group 14 of the first set is connected to a transistor arrangement at an emitter connection 41, and the control line 32 of the second transmission line group 17 of the second set is connected to the transistor arrangement at a base connection 42. The transistor arrangement includes a first PNP transistor 43 having its emitter connected to the emitter connection 41 through an emitter resistance 44, and having its base connected directly to the base connection 42. The collector of the first PNP transistor 43 is connected through a diode 45 to the gate electrode of the first silicon controlled switch 35.

The transistor arrangement also includes a second PNP transistor 50 having its emitter connected through an emitter resistance 51 to the emitter connection 41, and its base connected to the base connection 42. The collector of the second transistor 50 is connected through a diode 52 to the gate electrode of the second silicon controlled switch 36.

The switching circuit 12 operates in the following manner to provide signal paths between the first transmission line group 14 of the first set and the second transmission line group 17 of the second set. Under quiescent conditions, the silicon controlled switches 35 and 36 are non-conducting and provide a high impedance thus isolating the two transmission line groups from each other. A suitable biasing potential is applied between the signal lines 21 and 27 and between signal lines 22 and 28 by appropriate external circuitry (not shown) to forward bias the silicon controlled switches 35 and 36, respectively, below their breakdown potential.

In order to switch the silicon controlled switches 35 and 36 to their conducting conditions and thus establish signal paths through the switching circuit 12, momentary pulses are simultaneously applied to control lines 29 and 32, a positive-going pulse on the control line 29 and a negative-going pulses on control line 32. The coincident pulses are of sufficient magnitude to forward bias the transistors 43 and 50 to conduction, and current flows between the control lines 29 and 32 and across the emitter-base junctions of the transistors causing the transistors to conduct. Since either of the two pulses alone is insufficient to forward bias the emitter-base junction of a transistor to conduction, none of the transitors in the other switching circuits 10, 11, and 13 of the array are caused to conduct. Collector current in the transistors 43 and 50 flows through the diodes 42 and 52, the polarities of which are such as to permit normal collector current flow, and into the gate electrodes of the silicon controlled switches 35 and 36, respectively.

The flow of current to the gate electrodes of the silicon controlled switches 35 and 36 initiates turn-on of these devices and current flows through the forward biased silicon controlled switches from the signal lines of the first transmission line group 14 of the first set to the respective signal lines of the second transmission line group 17 of the second set. The biasing potential on the signal lines is such that the current which flows through each silicon controlled switch upon turn-on is greater than the minimum holding current. The external circuitry is capable of supplying current in excess of the minimum holding current, and thus the silicon controlled switches remain in the ON, or conducting condition, after termination of the momentary pulses on the control lines. The low impedance of the silicon controlled switches in their conducting condition provides direct paths for signals between the first transmission line group 14 of the first set and the second transmission line group 17 of the second set.

The transmission line groups 14 and 17 are disconnected from each other by resetting the switching circuit 12 to its quiescent condition. Any of various techniques which reduce the current through the silicon controlled switches 35 and 36 below the minimum holding current necessary to maintain conduction may be employed. For example, the current supplied by the external biasing circuitry may be interrupted or otherwise reduced to below the level necessary to sustain conduction in the silicon controlled switches, and the silicon controlled switches return to their nonconducting condition.

In the operation of the switching circuit as described, all of the control line current passes through the emitter-base junctions of the transistors of the transistor arrangement. Thus, all the control line current is available to be utilized as drive current by the transistors which provide collector current to the gate electrodes of the associated silicon controlled switches thereby obtaining rapid turn-on of the silicon controlled switches. In addition, since there are no other possible current paths between the control lines, there is no current leakage between control lines.

There are resistance elements in the emitter current paths of the transistors but not in the base current paths. Therefore, despite possible differences in the betas of the two transistors, current flow in their collectors is essentially the same. Thus, balanced turn-on conditions are applied to the two silicon controlled switches.

The diodes 45 and 52 serve as blocking diodes to prevent transient signal leakage paths during switching of other switching circuits of the array. For example, it is assumed that switching circuit 12 is activated connecting the first transmission line group 14 of the first set to the second transmission line group 17 of the second set. Then, if a connection is to be made between the first transmission line group 16 of the second set and some transmission line group of the first set, other than the first transmission line group 14, a negative-going pulse is applied to the control line 31 of the first transmission line group 16 of the second set. Since signals and bias voltages are present on signal lines 21 and 22, the negative-going pulse at the base connection 60 of the transistor arrangement of switching circuit 10 might be sufficient to forward bias the anode-to-gate of each silicon controlled switch 61 and 62 and the collector-to-base of each associated transistor 63 and 64 causing current to flow from the signal lines 21 and 22 to the control line 31. However, the blocking diodes 65 and 66 are arranged to block current flow in this direction thus preventing leakage current of this nature. Furthermore, without the blocking diodes 65 and 66, heavy current, limited only by external circuitry, could flow in the anode-to-gate of each silicon controlled switch 61 and collector-to-base of each associated transistor 63 and 64 during the turn-on pulse.

Although the communication system as illustrated in the drawing is a two-wire balanced-to-ground configuration, the switching circuit as shown may be modified for use with other configurations. For example, a single silicon controlled switch, a single transistor, and associated components may be employed in conjunction with a one-wire unbalanced-to-ground configuration having a single signal line and a control line in each transmission line group. For systems with three or more signal lines in each transmission line group, each switching circuit includes a silicon controlled switch for each path between signal lines and an equal number of associated transistors connected in parallel across the control lines.

Crosspoint switching arrays as shown may be employed in multistage switching systems in accordance with known techniques in the communication switching art, for example, as described in the aforementioned patent to Haselton.

Thus, while there has been shown and described what is considered a preferred embodiment of the present invention, it will be obvious to those skilled in the art that various changes and modifications may be made therein without departing from the invention as defined by the appended claims.

What is claimed is:

1. A crosspoint switching array for establishing particular signal transmission paths between selected transmission line groups of first and second sets of transmission line groups, each transmission line group of the first set being associated with each transmission line group of the second set at separate ones of a multiplicity of crosspoints, each transmission line group having at least two signal lines and a control line, said switching array comprising a controlled latching semiconductor device for each signal transmission path between a transmission line group of the first set and a transmission line group of the second set at each crosspoint, each of said semiconductor devices having first and second signal electrodes and a gate electrode, the first and second signal electrodes being adapted to be connected between signal lines in said first and second sets of transmission line groups;

a resistance for each controlled latching semiconductor device connected between the gate electrode and the second signal electrode of the associated semiconductor device;

transistor means at each crosspoint having an emitter connection for connecting to the control line of the transmission line group of one of the sets of transmission line groups and a base connection for connecting to the control line of the transmission line group of the other of the sets of transmission line groups;

each transistor means including a transistor associated with each controlled latching semiconductor device at the crosspoint, each transistor having an emitter, a base, and a collector with its emitter connected only to the emitter connection of the transistor means and to the emitter of each transistor at the same crosspoint and with its base connected only to the base connection of the transistor means and to the base of each transistor at the same crosspoint, the only paths for current flow between the control lines at the crosspoint being across the emitter-base junctions of the transistors at the crosspoint; and a blocking means connected in series between the gate electrode of each controlled latching semiconductor device and the collector of its associated transistor for blocking the flow of current along a path from the signal line connected to the first signal electrode of the semiconductor device, into the semiconductor device, from the gate electrode to the collector, through the transistor, and from the base connection of the transistor means to the control line connected to the base connection;

each blocking means being connected only to the juncture of the gate electrode and the resistance and to the collector of the transistor;

the application of coincident pulses to selected control lines at said first and second sets of transmission line groups causing current flow through the transistors at the selected crosspoints, thereby causing collector current to flow into the gate electrodes of the associated controlled latching semiconductor devices and establishing particular signal transmission paths between the selected transmission line groups.

2. A crosspoint switching array in accordance with claim 1 wherein each of said controlled latching semiconductor devices has a conducting condition and a non-conducting condition and is operable to be biased in the non-conducting condition so as to cause switching to the conducting condition in response to a momentary flow of current to the gate electrode whereby the flow of collector current from the associated transistor switches the controlled latching semiconductor device to the conducting condition providing a signal transmission path therethrough.

3. A crosspoint switching array in accordance with claim 2 wherein each blocking means includes a diode connected between the gate electrode of the associated controlled latching semiconductor device and the collector of the associated transistor and operable to permit normal collector current flow and to block current flow in the reverse direction.

4. A crosspoint switching array in accordance with claim 3 wherein each transistor means includes a resistance connected between the emitter of each transistor and the emitter connection; and each transistor means includes a direct connection between the base of each transistor and the base connection.

* * * * *